United States Patent
Röhrle

(10) Patent No.: US 6,216,972 B1
(45) Date of Patent: Apr. 17, 2001

(54) DEVICE FOR FORCE LIMITATION IN A VEHICLE OCCUPANT RESTRAINT SYSTEM

(75) Inventor: Martin Röhrle, Mutlangen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/382,919

(22) Filed: Aug. 25, 1999

(30) Foreign Application Priority Data

Sep. 10, 1998 (DE) .......................................... 298 16 280 U

(51) Int. Cl.⁷ .................................................. B60R 22/28
(52) U.S. Cl. .......................................................... 242/379.1
(58) Field of Search ........................ 242/379.1; 280/805, 280/806; 297/470, 471, 472

(56) References Cited

U.S. PATENT DOCUMENTS

| | | | | |
|---|---|---|---|---|
| 4,323,205 | * | 4/1982 | Tsuge et al. | 242/379.1 |
| 5,618,006 | * | 4/1997 | Sayles | 242/379.1 |
| 5,899,399 | * | 5/1999 | Brown et al. | 242/379.1 |
| 5,924,641 | * | 7/1999 | Keller et al. | 242/379.1 |
| 5,934,597 | * | 8/1999 | Ludwig | 242/379.1 |
| 5,975,451 | * | 11/1999 | Kawamoto | 242/379.1 |

FOREIGN PATENT DOCUMENTS

| 2200565 | 7/1975 | (DE) . |
|---|---|---|
| 0768219 | 4/1997 | (EP) . |

* cited by examiner

Primary Examiner—John M. Jillions
(74) Attorney, Agent, or Firm—Tarolli, Sundheim, Covell, Tummino & Szabo L.L.P.

(57) ABSTRACT

A device for force limitation with an annular housing in which a guide path is formed, comprises a carrier arranged inside the housing concentrically therewith, which is rotatable relative to the housing, and a traction means which is secured on the carrier, extends along a part of its length in the guide path and can be withdrawn from the guide path by rotation of the carrier relative to the housing and can be wound onto the the carrier.

9 Claims, 5 Drawing Sheets

DEVICE FOR FORCE LIMITATION IN A VEHICLE OCCUPANT RESTRAINT SYSTEM

The invention relates to a device for force limitation, which can be used in particular in a belt retractor for a vehicle safety belt.

BACKGROUND OF THE INVENTION

A force limitation device serves to make possible a movement between two components when a predetermined force or a predetermined torque is exceeded between them. The movement which then occurs can be converted for example into an additional path for deceleration for example of a vehicle occupant, whilst through the relative movement for example the belt webbing is released from a belt spool of a belt retractor.

Such force limitation devices are known in the most varied of embodiments. One problem in these force limitation devices consists in that under certain circumstances a characteristic of resistance over relative movement is desired, which drops. In the case of two components which are rotatable to each other, this means that it is desired that the torque necessary for the rotation of the two components relative to each other drops with a progressive angle of rotation. Such a characteristic can either not be achieved at all with the force limitation devices known hitherto or can only be achieved with a high structural expenditure.

The object of the invention therefore consists in providing a force limitation device which makes possible in a simple and reliable manner a characteristic of resistance over relative movement, which drops.

BRIEF DESCRIPTION OF THE INVENTION

This problem is solved by means of a device for force limitation, with an annular housing in which a guide path is formed, with a carrier arranged inside the housing concentrically therewith, which is rotatable relative to the housing, and with a traction means which is secured on the carrier, extends along a part of its length in the guide path and can be withdrawn from the guide path by rotation of the carrier relative to the housing and can be wound onto the the carrier. This construction is based on the basic principle that the resistance which counteracts a relative rotation between the housing and the carrier is made available by friction and deformation work of the traction means in the guide path. This resistance force is all the higher, the longer the part of the guide means is which is extending in the guide path. On relative rotation between the housing and the carrier, the traction means is, however, drawn out from the guide path so that the resistance force which is made available drops. In the extreme, the resistance force would drop to zero at the moment at which the traction means is drawn out completely from the guide path; however, this state can be prevented structurally, if it is not required.

BRIEF DESCRIPTION OF THE DRAWINGS

The invention is described hereinbelow with reference to a preferred embodiment which is illustrated in the enclosed drawings, in which.

DETAILED DESCRIPTION OF THE INVENTION

Figure 1:
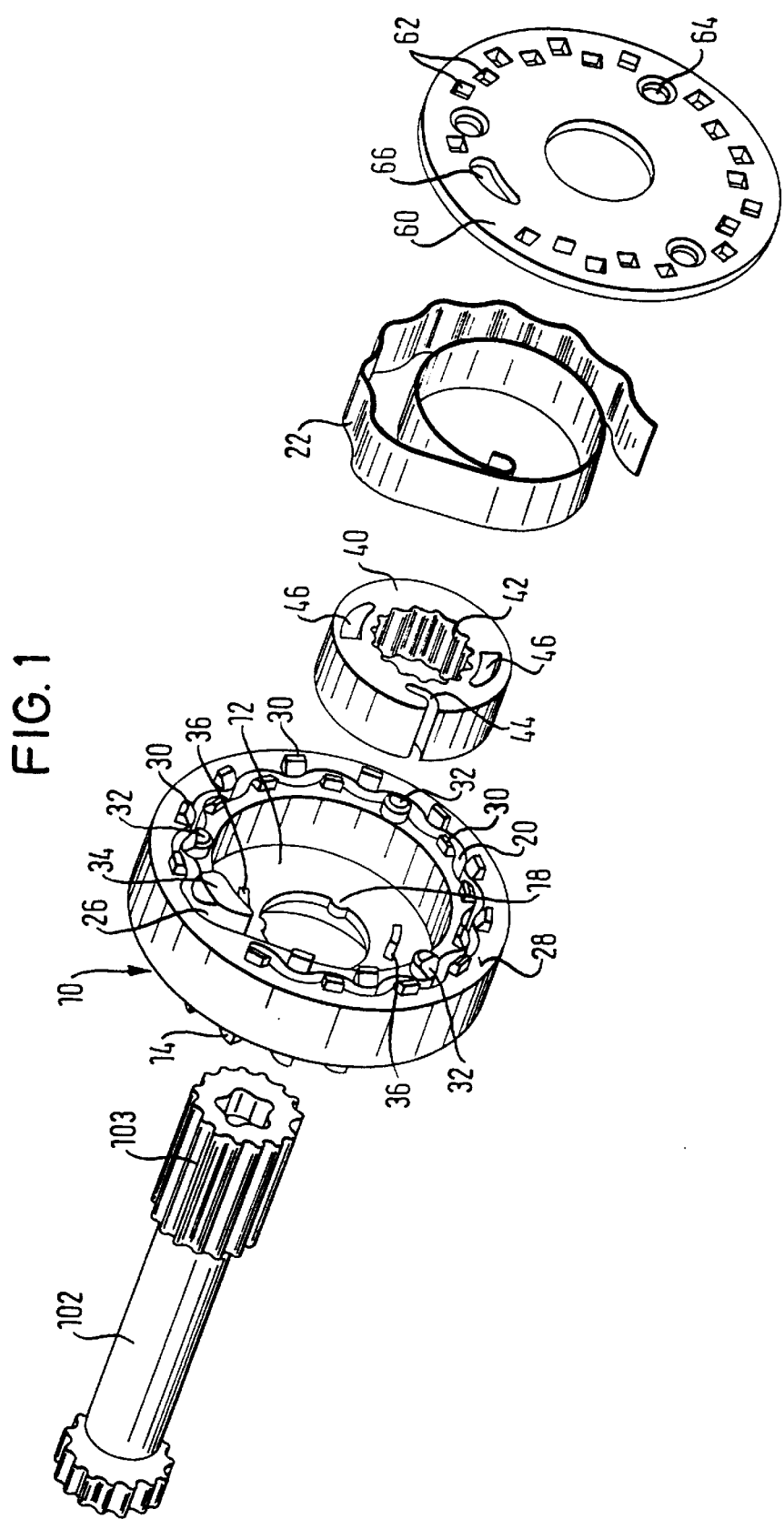
FIG. 1 shows a perspective exploded view of a force limitation device according to the invention.
Figure 2:
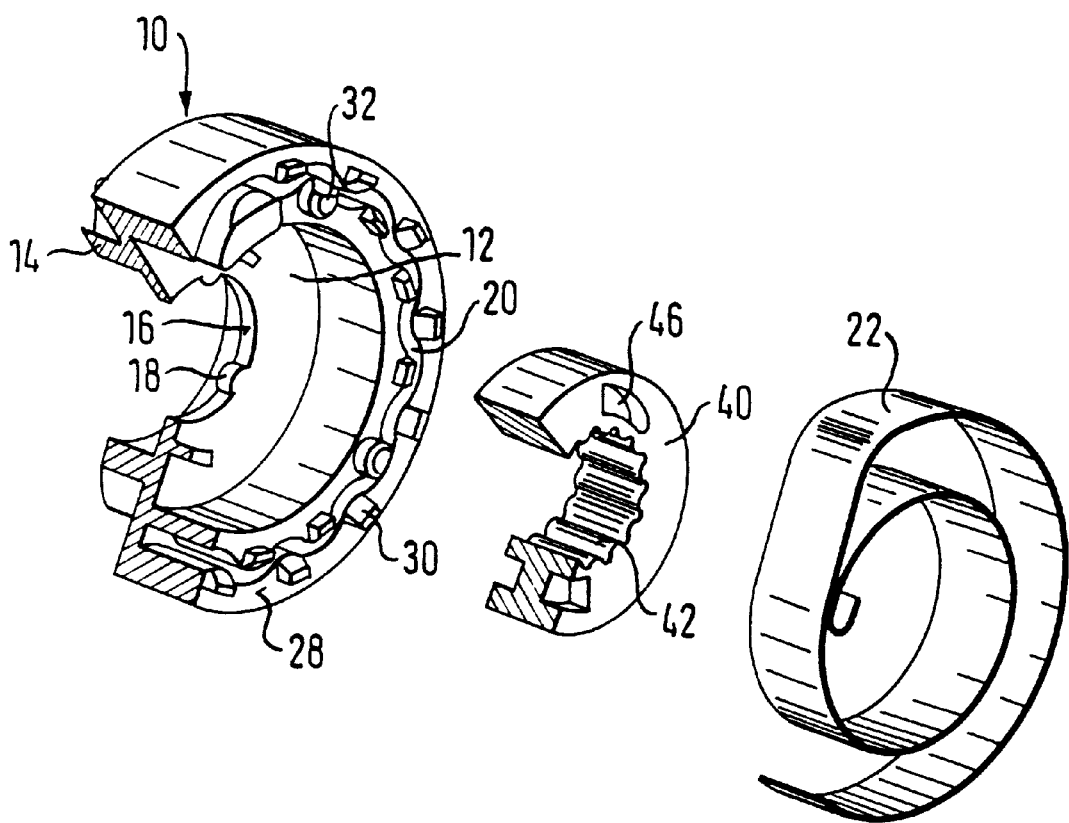
FIG. 2 shows the housing and the carrier of FIG. 1 in views partially in section and also the associated traction means.
Figure 3:
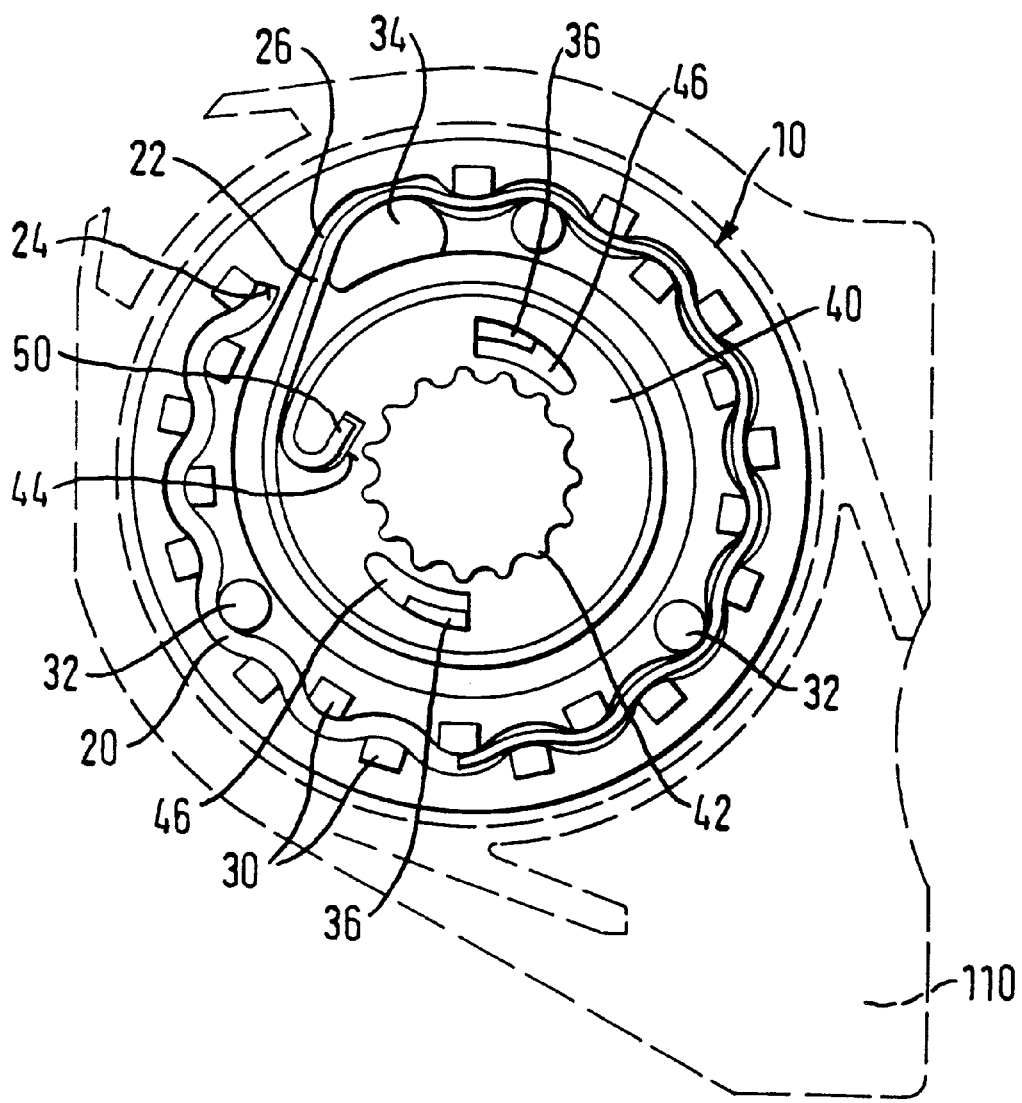
FIG. 3 shows in a diagrammatic cross-sectional view the force limitation device of FIG. 1 arranged in a belt retractor.

With the aid of FIGS. 1, 2 and 3, the construction of a device for force limitation according to the invention is described. The force limitation device contains a generally annular housing 10, on one end face of which a plate 12 is formed with a toothing 14. The plate 12 is provided with a port 16, on the edge of which several noses 18 are formed.

In the housing 10, a guide path 20, constructed as a duct, is formed for a traction means 22, which is constructed here as a spring steel band 22 with constant cross-section. The duct 20 extends in a winding line approximately concentrically about the central axis of the housing 10 along a circular path which in fact is not closed between the end 24 of the duct 20 and an inlet region 26 leading to the interior of the housing 10. The duct 20, in the form of a winding line, is constructed so that it is situated entirely between two imaginary cylinder faces which are concentric to the central axis of the housing 20. The duct 20 therefore touches alternately the inner and the outer imaginary cylinder face and namely the inner cylinder face with the inwardly directed bends and the outer cylinder face with the outwardly directed bends.

The duct 20 is open on the end face 28 of the housing 10 facing away from the plate 12. On this end face 28, several projections 30,32 are arranged along the duct 20. Each projection is situated on the inner face of a bend of the duct immediately adjoining the latter, each projection 30, 32 being provided with a chamfer which continues into the duct 20. The difference between the projections 30 and the projections 32 consists in that the projections 32 are constructed with a larger cross-section than the projections 30. In addition, a projection 34 is provided, which is arranged at the inlet region 26 of the duct 20 and likewise has a chamfer.

In addition, two tongues 36 are provided on the plate 12, which project into the interior of the housing 10.

Inside the housing, a carrier 40 is arranged which is provided with a central opening 42 which is constructed with a multi-toothed section. The carrier 40 is additionally provided with a notch 44 which extends in a hook shape into the interior, starting from the outer face of the carrier 40. Finally, the carrier 40 is provided on each end face with two bevel-shaped recesses 46 lying diametrically opposite each other.

The carrier 40 is arranged concentrically to the housing 10 in its interior. The carrier 40 engages here with its bevel-shaped recesses 46 over the tongues 36. Then the steel band 22 is mounted between the carrier 40 and the housing 10, this steel band 22 engaging by an end 50 into the notch 44 of the carrier 40. Starting from this end 50, the steel band extends one revolution around the carrier 40, so that a sufficiently great looping friction can be built up, which prevents excessive stresses of the end 50 of the steel band. Then the steel band 22 runs through the run-in region 26 into the duct 20, in which the steel band 22 extends in the form of a winding line. In FIG. 2 the steel band 22 is shown in non-mounted state, from which it can be seen that the part of the steel band which is later arranged in the duct 20 does not yet run in the form of a winding line. In FIG. 1, the steel band is shown in the form which it has after insertion into the duct 20. The path in the form of a winding line can be clearly seen, which the steel band is given by the duct 20. The insertion of the steel band into the duct 20 is facilitated by the projections 30 32, 34 which are provided with the chamfers. As can be seen in FIG. 3, the steel band 22 does not extend along the entire length of the duct 20; the duct 20 therefore is constructed longer here than would be necessary for receiving the steel band which is used. This makes it possible to use different lengths of a steel band with the same housing.

The force limitation device which is described operates in the following manner: When the carrier 40 is turned anti-clockwise relative to the housing 10, the carrier draws the steel band 22 out from the duct 20. With this movement, a resistance force occurs in the region of each bend of the steel band 22, which results on the one hand from the looping friction between the wall of the duct at this point and the steel band and on the other hand from the bending resistance of the steel band. This resistance force counteracts a relative rotation between the carrier 40 and the housing 10.

With increasing rotation of the carrier 40 relative to the housing, the steel band 22 is drawn out further and further from the duct 20, so that fewer and fewer bending points of the steel band 22 are available, which can generate a resistance force. For this reason, the resistance against a relative rotation between the carrier 40 and the housing 10 decreases as the angle of rotation increases. Such a path of resistance over relative movement was only known from the prior art when a traction means with reducing cross-section was used. However, such a cross-section is only able to be produced at an extremely high expenditure. On the other hand, in the force limitation device according to the invention, a strip of spring steel can be used which is simple to produce, has a constant cross-section and therefore can be obtained by simply cutting to length spring steel which is supplied continuously.

On the end face 28 of the housing 10, a covering 60 can be placed which is provided with openings 62, 64, 66 for the projections 30, 32 or respectively 34. In this way, the projections 30, 32, 34 are supported in the plate 60, so that a duct is produced which is closed on all sides and which has a high strength. The projections 30, 32 mounted in the plate 60 prevent the duct from expanding when the steel band 22 is drawn out from it, because the projections 30, 32 receive the spreading forces. The projection 34 mounted in the plate 60 ensures that the forces occurring on withdrawal of the steel band 22 from the duct 20 are received reliably at the inlet region 26 of the duct and can not lead to material deformations or destructions. The plate 60 is held on the end face 28 of the housing 10 in that the projections 32, constructed with a larger cross-section, are deformed on the outer face of the plate 60 in the manner of a rivet, so that the plate is held against the housing.

Figure 4:
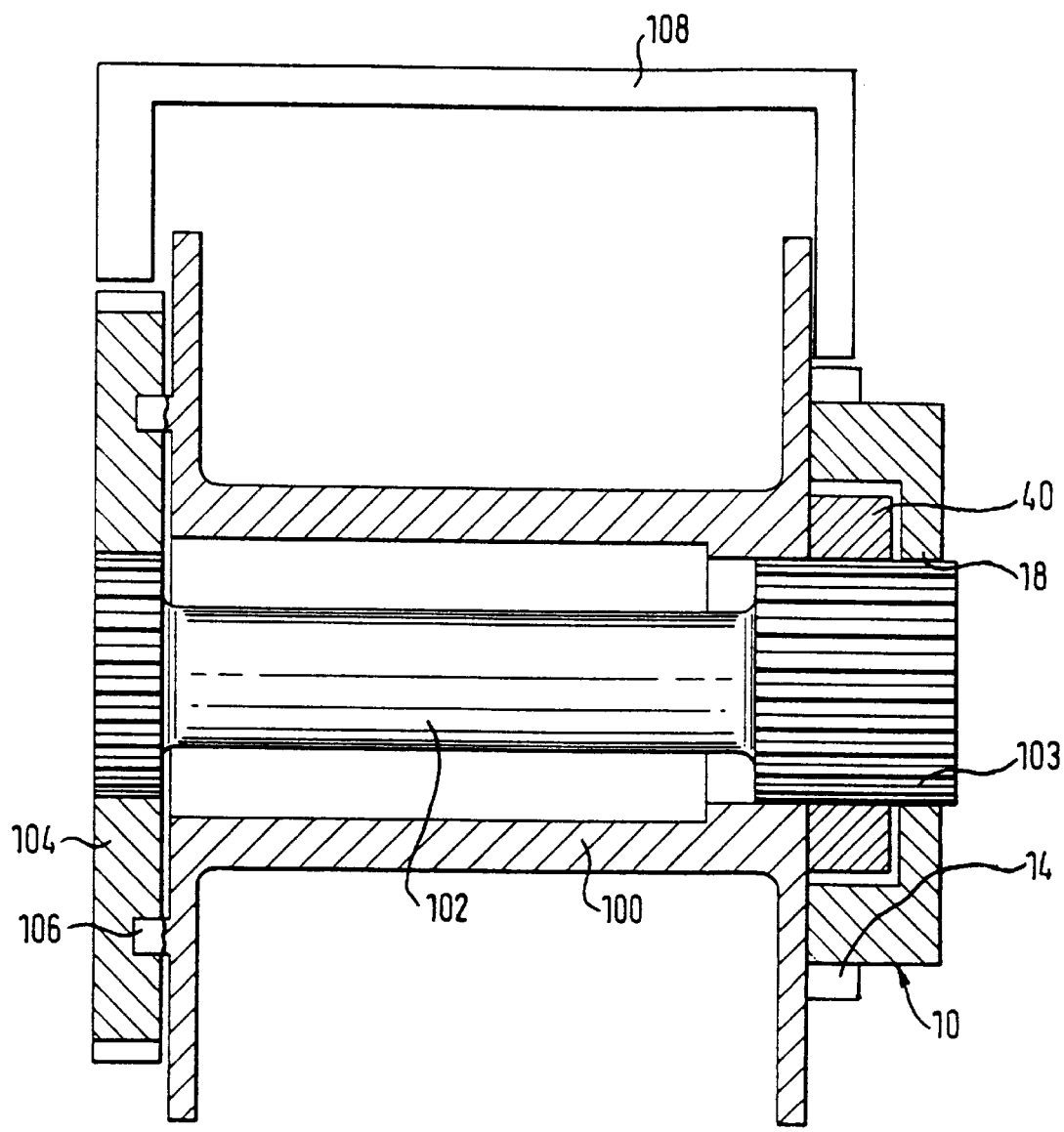
FIG. 4 shows in a diagrammatic side view the force limitation device of FIG. 1 arranged in a belt retractor.

The force limitation device according to the invention can be used advantageously in a belt retractor in order to achieve a controlled rotation of the belt spool after a locking of the belt spool, so that as of a predetermined belt webbing unwinding force, an unwinding of the belt webbing from the belt retractor is possible, so that stress peaks in the safety belt system can be avoided or reduced. Such a belt retractor is shown diagrammatically in FIG. 4. The belt retractor contains a belt spool 100, inside which a torsion rod 102 is arranged (see also FIG. 1). The torsion rod is provided at both ends with splines, the right-hand end 103, with respect to FIG. 4, being held non-rotatably in the belt spool 100. At the left end of the torsion rod 102, the toothing is held non-rotatably in a locking disc 104 which can be optionally connected by shear pins 106 with the belt spool 100. At the right-hand end 103 of the torsion rod 102, with respect to FIG. 4, the carrier 40 of the force limitation device is also mounted. In addition, the noses 18, which are constructed on the plate 12 of the housing 10, engage into the right-hand toothing of the torsion rod 102. Finally, a locking catch 108 is provided which on one side can be directed into the locking disc 104 and on the other side can be directed into the locking toothing 14 of the housing 10.

This belt retractor operates as follows: In normal operation the belt spool 100 is freely rotatable by means of mountings, which are not illustrated, against the action of a retractor spring in a housing 110 (see FIG. 3). In order to prevent the rotation of the belt spool 100 in the belt webbing unwinding direction in the case of necessity, the locking catch 108 can either be directed in a belt-webbing-sensitive or vehicle-sensitive manner into the locking toothings of the locking disc 104 or of the housing 10. In this state, if the shear pins 106 are present, the belt spool can not be rotated further in the belt webbing unwinding direction.

If, on the other hand, such a high torque is applied onto the belt spool 100 via the belt webbing, that the optional shear pins 106 are sheared off, the belt spool begins to rotate under the action of the force applied by the belt webbing. In so doing, a relative rotation occurs between the carrier 40, which is connected non-rotatably with the belt spool 100 via the toothing 103, and the housing 10, which is held non-rotatably by the locking catch 108 and the toothing 14. At the start of this relative rotation, the noses 18 on the plate 12 of the housing 10 are sheared off, so that the toothing 103 of the torsion rod 102 can rotate relative to the housing 10. At the same time, the tongues 36 on the plate 12 are sheared off. The carrier 40 then rotates relative to the housing 10, the steel band 22 being drawn out from the duct 20. At the same time, the torsion rod 102 is twisted because it is held non-rotatably at one end by the locking disc 104.

By suitable dimensioning of the torsion rod 102 and suitable design of the force limitation device, the desired course of the belt webbing unwinding force can now be set over rotation of the belt spool and hence released belt webbing length. Basically, a superimposing of two contrary characteristics is brought about: The resistance force provided by the force limitation device against a relative rotation between the carrier 40 and the housing 10 decreases with progressive relative rotation, whilst the resistance moment provided by the torsion rod 102 rises with increasing twisting of the torsion rod. As a function of the relationships of these two characteristics, as a whole a rising or a falling course of belt webbing unwinding force can be achieved over the released belt webbing length.

Figure 5:
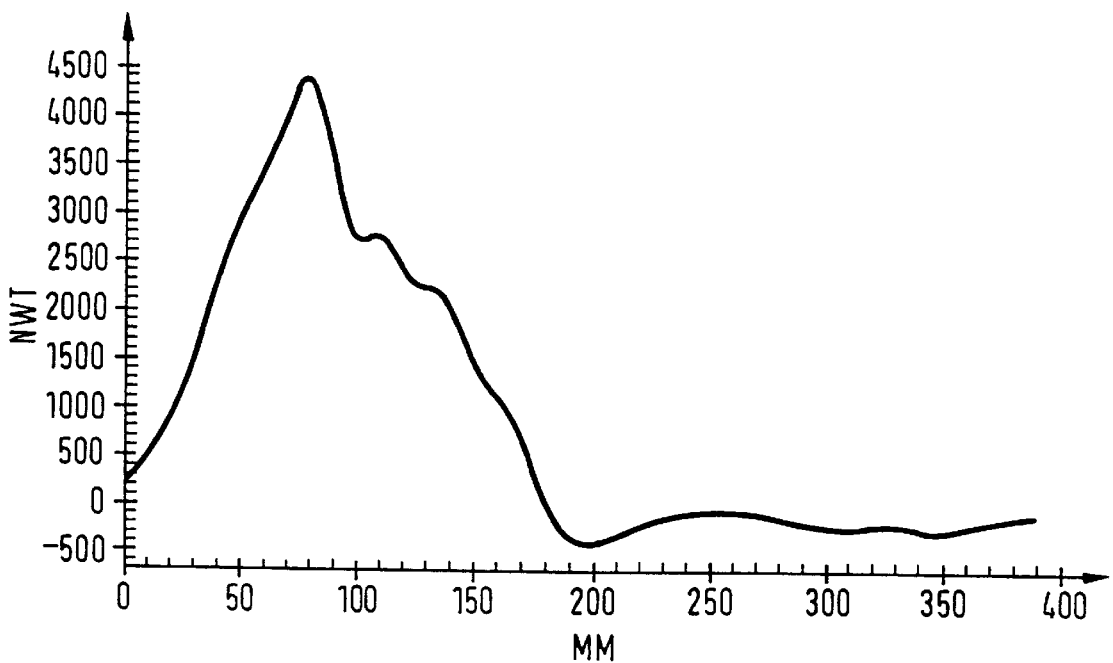
FIG. 5 shows a characteristic of belt webbing unwinding force over unwound belt webbing length with a belt retractor without torsion rod, provided with the force limitation device of FIG. 1.

In FIG. 5 a curve of belt webbing unwinding force over withdrawn belt webbing length is shown, as results with the force limitation device according to the invention. It can be seen that the belt webbing unwinding force firstly rises intensively. In this region of the curve, firstly all components of the force limitation device are prestressed (in particular "film roll effect"), without the steel band already being withdrawn from the duct. The maximum value corresponds to the state of the force limitation device immediately before the steel band starts to move. Then an intensive drop of the characteristic occurs, which results from the fact that the steel band 22 is withdrawn from the duct 20. The lowering of the characteristic to a value of the resistance force less than zero is to be attributed to the fact that the characteristic was determined in a dynamic test in which oscillation phenomena occur.

Figure 6:
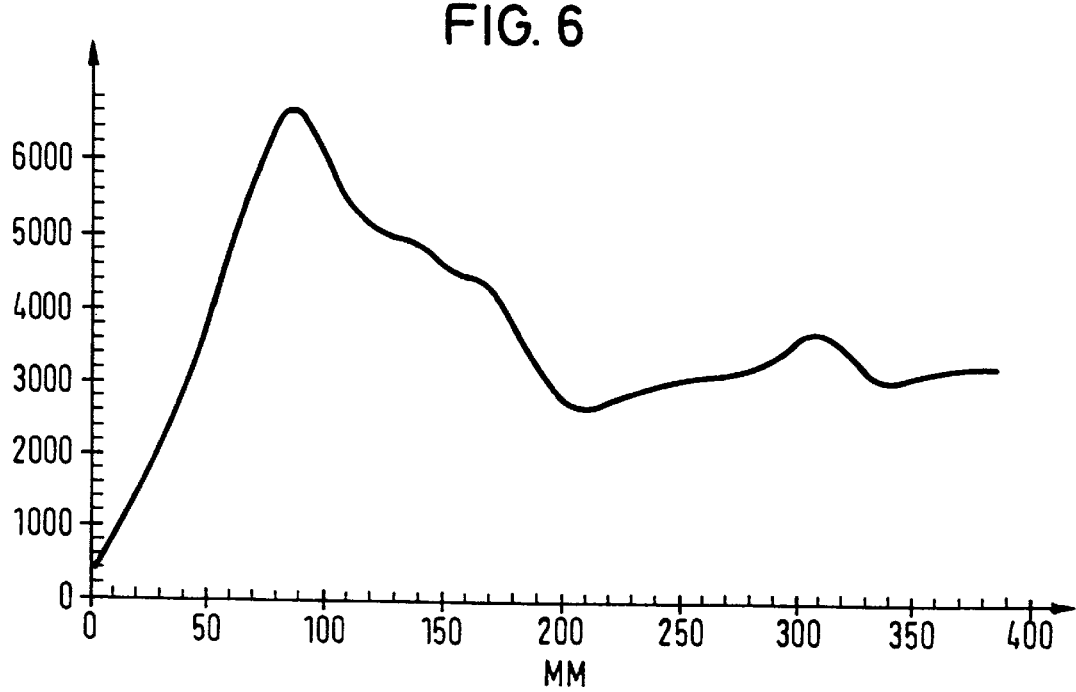
FIG. 6 shows a characteristic of belt webbing unwinding force over unwound belt webbing length with a belt retractor with torsion rod, provided with the force limitation device of FIG. 1.

In FIG. 6 the characteristic is shown which was obtained in the force limitation device according to the invention in connection with a torsion rod. Following the obtained maximum value of the resistance force, a lowering of the characteristic occurs, which is to be attributed to the friction force, declining with increasing relative rotation, and deformation work of the steel band 22 in the duct 20. Then the characteristic rises again. This is to be attributed to the fact that the torsion rod is now twisted to such an extent that its rising resistance moment becomes noticeable, whilst the component of the overall resistance force originating from the force limitation device becomes negligible or the steel band is already completely withdrawn from the duct.

In a further development which is not illustrated, provision can be made that the degree of deformation of the steel band is different at each deflection point, for example through different radii. In this way, a smaller deformation work can be achieved in the vicinity of the run-in region, which leads to a further falling characteristic.

What is claimed is:

1. A device for force limitation, with an annular housing in which a guide path is formed, with a carrier arranged inside said housing concentrically therewith, which is rotatable relative to said housing, and with a traction means which is secured on said carrier, extends along a part of its length in said guide path and can be withdrawn from said guide path by rotation of said carrier relative to said housing and can be wound onto said carrier, said guide path being defined by a duct with constant cross-section, which extends in a winding line said duct including a plurality of radially inwardly and outwardly directed bend.

2. The device of claim 1, wherein said traction means is a steel band with constant cross-section.

3. The device of claim 1, wherein said duct extends between two cylinder faces concentric with each other and with a rotation axis of said carrier, and around said rotation axis.

4. The device of claim 1, wherein said duct is constructed in said housing in such a way that it is accessible from an end face of said housing, said end face being provided with projections, said projections having chamfers in order to facilitate the insertion of said traction means into said duct.

5. The device of claim 4, wherein on said end face a cover is arranged which closes said duct, said cover being provided with openings through which said projections project.

6. The device of claim 5, wherein some of said projections are constructed so as to be enlarged and are deformed at the exterior of said cover so that said cover is fastened to said housing.

7. The device of claim 1, wherein said device is arranged on a belt retractor for a vehicle safety belt, said housing having a locking toothing adapted to be engaged by a locking catch of said belt retractor.

8. The device of claim 7, wherein a torsion rod is provided having two ends, one of said ends being connected non-rotatably to said carrier and the other end being connected non-rotatably to a belt spool of said belt retractor.

9. A device for force limitation, with an annular housing in which a guide path is formed, with a carrier arranged inside said housing concentrically therewith, which is rotatable relative to said housing, and with a traction means which is secured on said carrier, extends along a part of its length in said guide path and can be withdrawn from said guide path by rotation of said carrier relative to said housing and can be wound onto said carrier, the device being arranged on a belt retractor for a vehicle safety belt, said housing having a locking toothing adapted to be engaged by a locking catch of said belt retractor, a torsion rod being provided having two ends, one of said ends being connected non-rotatably to said carrier and the other end being connected non-rotatably to a belt spool of said belt retractor.

* * * * *